June 6, 1967 W. J. THORNHILL 3,323,687
FLUID DISPENSER WITH MOVABLE TRAP CHAMBER
HAVING DOUBLE-ENDED EJECTOR
Filed July 29, 1965 2 Sheets-Sheet 1

INVENTOR
W. J. THORNHILL
BY
Young + Quigg
ATTORNEYS

INVENTOR
W. J. THORNHILL
BY
Young & Quigg
ATTORNEYS

United States Patent Office 3,323,687
Patented June 6, 1967

3,323,687
FLUID DISPENSER WITH MOVABLE TRAP CHAMBER HAVING DOUBLE-ENDED EJECTOR
William J. Thornhill, Bartlesville, Okla., assignor to Phillips Petroleum Company, a corporation of Delaware
Filed July 29, 1965, Ser. No. 475,790
10 Claims. (Cl. 222—219)

This invention relates to a method and apparatus for rotating a rotatable member. In one aspect, this invention relates to a method and apparatus for rotating a valve means, the normal operational mode of which requires rotation through a 180° increment with a stoppage of rotation and time pause after rotation of the first 90° of that 180° increment, the remaining 90° rotation of the 180° increment being executed after elapse of said time pause.

In U.S. Patent 3,167,398, issued Jan. 26, 1965, the disclosure of which is hereby incorporated herein by reference, there is disclosed a metering valve which is designed to discharge a fixed amount of a material such as a catalyst into a receiver such as a polymerization reactor. This metering valve employs a rotatable member having a chamber therein and a ball in the chamber which serves both as a spherical piston and as a stopping or plug means for either end of the chamber with which the ball happens to be in contact. In operation, this chamber member is filled with catalyst forcing the ball to a first end of the chamber. The chamber member is then rotated 90° to the off position so that catalyst can neither enter nor leave the chamber. When it is desired to discharge catalyst from the chamber, the chamber member is rotated another 90° thereby aligning same with inlet and outlet conduits and catalyst from the inlet conduit forces the ball toward the opposite end of the chamber which in turn forces catalyst out of the chamber into the discharge conduit. The discharge conduit is in communication with the polymerization reactor. Thus, the chamber is emptied of and filled with catalyst at the same time. The chamber member is then rotated another 90° to the off position, and subsequently, yet another 90° to the on position to repeat the catalyst discharge and fill operation again. In the operation of this metering valve there is involved a rotation increment of 180° between off positions and a similar increment between on positions; however, between the two off positions, 90° from either one, is each open position and in order to operate the metering valve effectively a time pause of the chamber member must be effected at this 90° midpoint between the two off positions. Thus, the cycle is to start at an off position, a first 90° rotation into the open position, pause for a finite length of time to allow the chamber to both discharge and fill with catalyst, and then a second 90° rotation in the same direction to the second off position.

Heretofore, methods and apparatus for operating this metering valve have rotated the chamber member continuously in one direction. For example, the chamber member has been rotated from an off position clockwise to an on position, held for a finite length of time in this position, and then rotated another 90° in a clockwise manner to the second off position. This cycle is repeated over and over, the chamber member always being rotated in the clockwise direction.

The apparatus employed to effect the above-mentioned continual rotation of a member in one direction with intermittent time pauses during such rotation has employed various mechanical means including a ratcheting system wherein the actuator that rotates the chamber member rotates only 180° from one position to the extreme position and, therefore, after each rotation of the chamber member through a 180° increment, must rotate back so that it can rotate that member again through another 180° increment. The use of specially designed and built ratcheting systems is quite expensive and unless such systems are precisely aligned and adjusted and maintained, the chamber member is at least partially moved backward with the actuator when it ratchets back to prepare for another 180° increment of rotation. This backward movement of the chamber member is not desirable since the ratcheting system may not always engage when the actuator reaches its extreme back position and therefore may not rotate the chamber upon the next forward movement thereof.

Also, in many applications it is not desirable or feasible from either a space or other point of view to rotate a member through a full 360° arc but rather is better to employ only a 180° arc. Further, the apparatus employed to effect only forward and reverse rotation through the same 180° arc cannot in many instances be simplified for that required for a 360° arc.

It has now been found that a more simplified method of rotating a rotatable member such as the one described above can be effected by rotating said member through a first increment of about one-half the magnitude (90° hereinabove) of the fixed increment (180° hereinabove) in a first direction, maintaining that member a finite length of time in the position reached by same at the end of this first increment of rotation, then rotating said member through a second increment of a magnitude substantially equal to that of the first increment in a direction opposite to said first direction. Thus, by this invention, instead of rotating the above chamber member through a 180° increment in a single direction (clockwise) the chamber member is first rotated from a closed position 90° clockwise to the open position, held in the open position for a finite length of time, and then rather than being rotated a second 90° in a clockwise manner to the second closed position, said member is instead rotated 90° counterclockwise back to the first closed position.

Further in accordance with the method of this invention, when a subsequent cycle of rotation through the fixed increment (180°) is initiated, the rotatable member is rotated through the first sub-increment of rotation (90°) in the same direction as the rotatable member was moving when the prior cycle was terminated. Thus, in the case of the above metering valve, if the chamber member was rotating in a counterclockwise direction when the prior cycle was terminated, when the next cycle is initiated, the chamber member will be rotated 90° counterclockwise to the open position, and after the time pause, rotated 90° in a clockwise direction back to the same closed position.

The apparatus in accordance with this invention employs an actuator means adapted to rotate the rotatable member for a fixed increment (180°) in a first direction and then a substantially equal increment in the opposite direction, i.e., the actuator means rotates clockwise and counterclockwise only through the same 180° increment and does not rotate through 360° or even different 180° increments. A power means is operatively connected to the actuator means, which power means is used to operate the actuator means in the desired first sub-increment (90°) forward—pause—second sub-increment (90°) reverse rotational cycle. The power means utilizes a first means for causing the actuator to rotate the rotatable member through the first sub-increment and stop, and a time delay means operatively connected to said first means and adapted to maintain the rotatable member for a finite period of time in the position reached by same after termination of the first sub-increment of rotation. A second means is operatively connected to both the time delay means and the actuator means and is adapted to rotate the rotatable member through the second sub-increment in a direction opposite to the direction of the first sub-increment after the time delay means runs out.

Further in accordance with the apparatus of this invention the first and second means are adapted to, on the initiation of a subsequent cycle, rotate the rotatable member through the first sub-increment of that cycle in the same direction that that member was rotating upon termination of the prior cycle and then after the time pause, rotate the member through the second sub-increment of the cycle in a direction opposite to the direction of the first sub-increment.

Accordingly, it is an object of this invention to provide a new and improved method and apparatus for rotating a rotatable member. One object of this invention is to rotate a valve means which requires 180° of rotation to complete an operation cycle so that said cycle is carried out by utilizing rotational increments of differing directions.

Although, for the sake of clarity, this invention will be described in relation to rotatable metering apparatus, it is to be understood at the outset that the invention is not so limited. This invention, therefore, is applicable to the rotation of a rotatable member through a precise cycle of events including stopping and holding of the rotatable member in certain desired orientations during the performance of any one cycle.

In the drawings FIGURE 1 shows a cross-sectional elevation of an actuator and power means embodying this invention.

Figure 1:
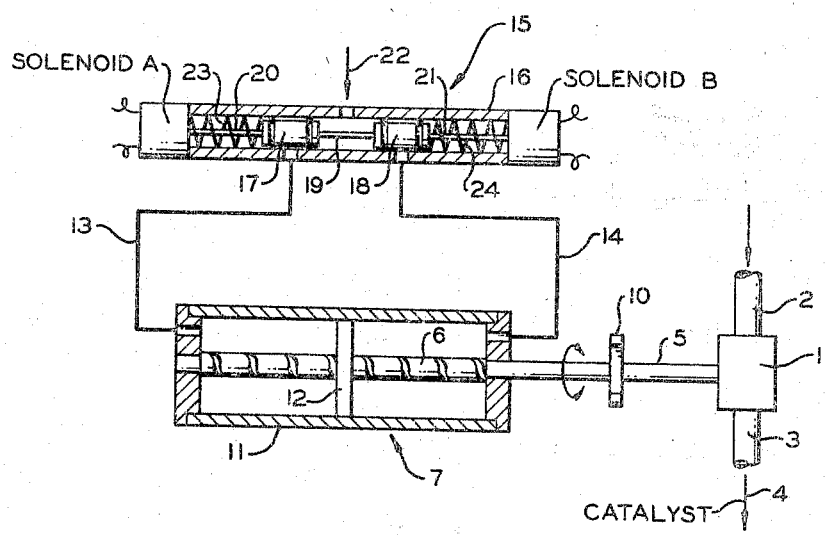

In FIGURE 1 there is shown a metering valve 1 having an inlet pipe 2 and an outlet pipe 3 for carrying catalyst in the direction of arrow 4 into a polymerization reactor. Valve 1 can be the valve or valves disclosed in U.S. Patent 3,167,398. Shaft 5 is connected to valve 1 and spirally grooved shaft 6 in actuator 7. Shaft 5 also has fixed thereto cam means 10.

Actuator 7 has a gas-tight casing 11 in which piston 12 is mounted upon grooved shaft 6 so that movement of the piston along the longitudinal axis of shaft 6 causes rotation of shafts 5 and 6 and therefore the chamber member of valve 1. Piston 12 is moved along shaft 6 by a gas such as air passing into and/or out of pipes 13 and 14. By this invention the length of shaft 6 and relative spacing of the grooves on that shaft are such that as the piston travels from one end of the shaft to the opposite end valve 1 is rotated through a 180° arc. Thus, as piston 12 moves from one end of housing 11 to the opposite end and back again, valve 1 is rotated 180° clockwise and then 180° counterclockwise.

Four-way, open exhaust valve 15 has a casing 16 which contains dual pistons 17 and 18 which are connected together by shaft 19 and to solenoids A and B by shafts 20 and 21, respectively. Air is admitted to the piston chamber of valve 15 through conduit 22. In operation, when a solenoid is energized it forces pistons 17 and 18 in a direction such that air is admitted either through conduits 13 or 14 to force piston 12 in one direction and to allow exhaust of air from housing 11 through whichever conduit 13 or 14 is not being employed to pass air into housing 11. Since by this invention it is important the position of valve 1 the same after termination of a prior cycle until initiation of a subsequent cycle, centering springs 23 and 24 are employed in a conventional manner so that when both solenoids A and B are deenergized, pistons 17 and 18 are automatically centered so as to close off conduits 13 and 14 thereby preventing the escape of air from either side of piston 12 in housing 11 thereby maintaining piston 12 in the desired position after termination of the cycle. The precise connection of the centering springs with the piston and their associated shafts is well known and therefore not shown in detail here. A suitable four-way valve complete with centering springs in produced by the Industrial Products Division of the Westinghouse Air Brake Company. A presently preferred type of such valves is that which employs solenoids A and B to control valves that admit or prevent the admission of air to the interior of valve 15. Thus, the air and not the solenoids are the power factor which moves pistons 17 and 18. This eliminates mechanical movement of pistons 17 and 18 and lowers the power requirement capability for the solenoids since they then act only to open and close a conventional air flow control valve associated with each.

Figure 2:
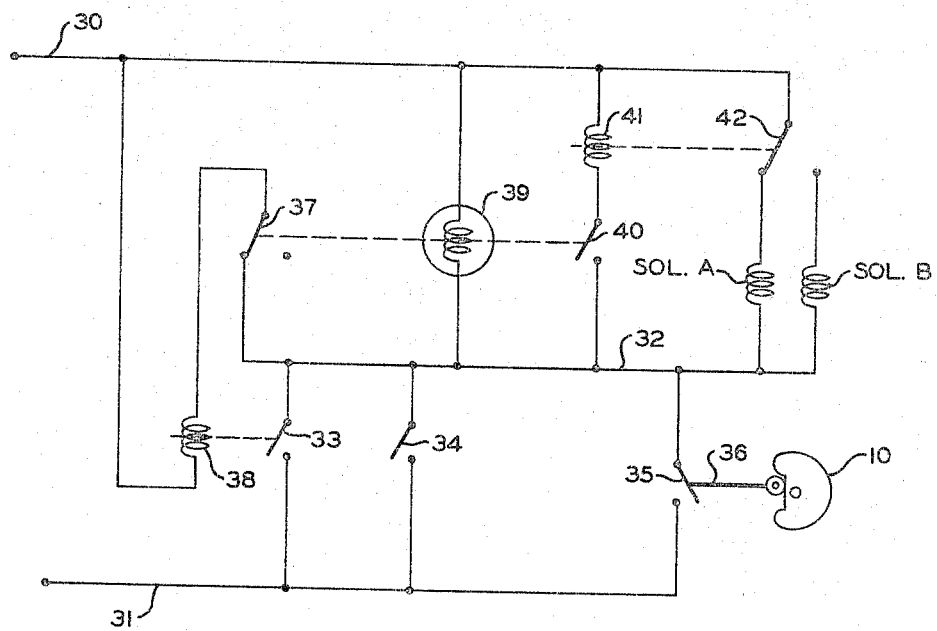
FIGURE 2 shows a system embodying this invention.

FIGURE 2 shows a system for alternately energizing solenoids A and B so as to operate valve 15 and actuator 7 in a manner which causes the desired rotation cycle of valve 1 to be effected. FIGURE 2 shows power lines 30 and 31 which are electrical conduits. Although the systems of FIGURES 2, 4, and 5 can be either electrical, pneumatic, hydraulic, and the like, for the sake of simplicity these systems are described as electrical systems and the term "line" unless otherwise indicated is meant to refer to an electrical conduit. It is to be noted, however, that this invention is not limited to electrical systems. Line 31 in connected to line 32 through relay switch 33, triggering switch 34, and cam switch 35. Cam switch 35 is operatively connected through cam follower 36 to cam 10 which cam is carried by shaft 5 as shown in FIGURE 1. Line 32 is connected to line 30 through switch 37 and coil 38. Coil 38 and relay switch 33 comprise a latching relay so that energization of coil 38 causes closure of switch 33. Line 32 is also connected to line 30 through time delay relay 39 and through switch 40 and coil 41.

Time delay relay 39 is operatively connected to both switch 37 and 40 so that, after activation of that relay and the running out of the time delay portion, switches 37 and 40 are closed. Time delay relay 39 is of the type that automatically resets itself after being deenergized. A suitable time delay relay is a Telex-Aemco No. DD10–02 having a 1 to 10 second variable time range. Solenoids A and B can, one at a time, be connected between lines 32 and 30 through switch 42 which is operatively connected to coil 41 and adapted to be switched back and forth upon energization and deenergization of that coil.

Figure 3:
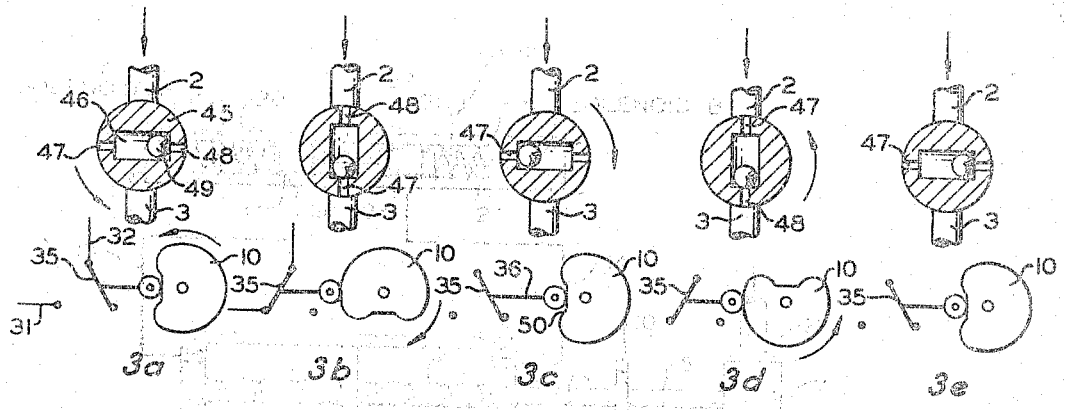
FIGURE 3 shows the relative relationships of the rotatable member of FIGURE 1 and the rotatable part of the apparatus of FIGURE 2.

In FIGURE 3 there is shown rotatable chamber member 45 having machined therein chamber 46, inlet and/or outlet conduits 47 and 48. Ball 49 is movably carried in chamber 46 of chamber member 45.

In the operation of FIGURE 3, member 45 is in a closed position, i.e. transverse to conduits 2 and 3, and cam 10 has opened switch 35 as shown in FIGURE 3a. If triggering switch 34 of FIGURE 2 is contacted momentarily it will energize coil 38 thereby closing switch 33 so that even though switch 34 is almost immediately reopened the circuit is kept closed by switch 33. Closure of the circuit starts time delay 39 running and energization of solenoid A. Energization of solenoid A causes rotation of shaft 5 and therefore valve 1 and cam 10 of FIGURE 1. As an example, cam 10 and member 45 both rotate counterclockwise as shown in FIGURE 3a until piston 12 reaches one end of housing 11 at which time further rotation of member 45 and cam 10 is prevented and member 45 is stopped in the open position as shown in FIGURE 3b. In this position ball 49 is forced toward conduit 47 of member 45, by pressurized catalyst entering through 48, thereby emptying chamber 46 on one side of the ball and filling the chamber on the other side.

After time delay means 39 runs out it opens switch 37 and closes switch 40. Closure of switch 40 energizes coil 41 which transfers switch 42 from solenoid A to solenoid B. Energization of solenoid B then follows which causes piston 12 to be moved in the opposite direction which causes rotation of member 45 and cam 10 in a clockwise direction, as shown in FIGURE 3c, which rotation is stopped by cam follower 36 falling into depression 50 in cam 10 thereby opening switch 35. Note that in FIGURE 3b cam 10 has closed switch 35 so that even though switch 37 was opened by time delay means 39, which caused deenergization of coil 38 and therefore opening of switch 33, the circuit was still closed through switch 35.

However, as shown in FIGURE 3c after rotation of member 45 through 90° in a counterclockwise motion (FIGURE 3a), pausing of member 45 in the position reached at the end of the first 90° sub-increment of rotation (FIGURE 3b), member 45 is rotated through a second 90° sub-increment in the opposite direction, i.e. clockwise which rotation is stopped by the opening of switch 35. Thus, the cycle is completed, but note that at the completion of this cycle, piston 12 will be at a point intermediate the length of housing 11 and due to valve 15 this position will be maintained until the next closing of switch 34. When switch 34 is again closed momentarily to initiate the subsequent cycle, member 45 will continue to rotate in the same direction it was rotating when the prior cycle was terminated because switch 42 remains in contact with solenoid B even though the prior cycle was finished and switches 33, 37, and 40 had been reset to the position shown in FIGURE 2.

Thus, upon initiation of the next cycle member 46 is rotated clockwise as shown in FIGURE 3c to the open position which allows ball 49 to move downward toward conduit 48 thereby discharging and filling chamber in member 46. This position is shown in FIGURE 3d and also represents the opposite extreme position for piston 12 from the extreme position represented by FIGURE 3b so that rotation of member 46 and cam 10 is stopped in this position by piston 12 reaching the end of housing 11. In this open position as with FIGURE 3b cam 10 has closed switch 35 so that the circuit remains closed notwithstanding the opening of switch 37 when time delay means 39 runs out and closes switch 40. When this occurs switch 42 is switched back to solenoid A thereby energizing same and causing rotation of member 45 in a counterclockwise direction as shown in FIGURE 3d to the closed position of FIGURE 3a at which time cam 10 opens switch 35 thereby breaking the circuit and terminating the cycle.

Figure 4:
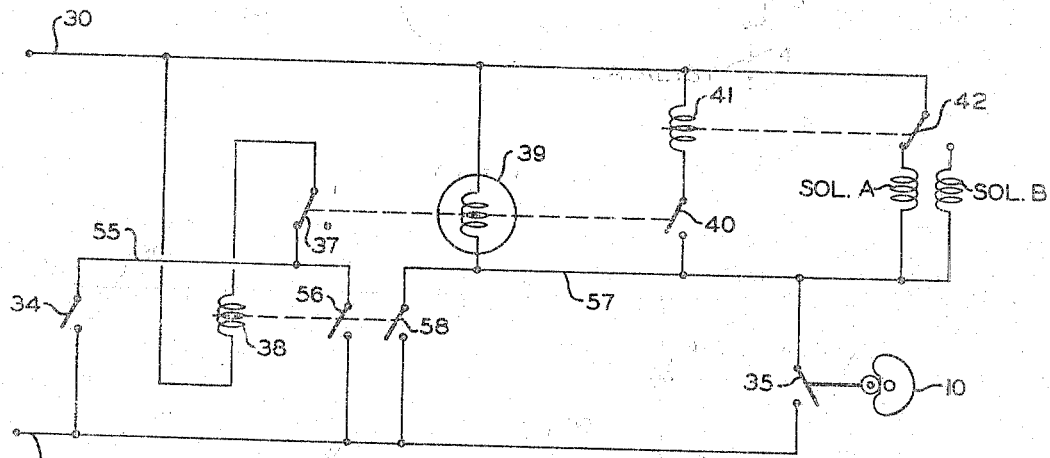
FIGURES 4 and 5 show other systems embodying this invention.

FIGURE 4 shows power lines 30 and 31. Line 31 is connected to line 30 through triggering switch 34, line 55, switch 37, and coil 38. In lieu of triggering switch 34, line 31 is connected to line 30 through the same apparatus as triggering switch 34 but utilizing instead relay switch 56. Line 31 is also connected to line 57 through a second relay switch 58 and through switch 35. Thus, when coil 38 is now energized both switches 56 and 58 are closed and when deenergized both are open. Line 57 is connected to line 30 through time delay means 39 and through switch 40 and coil 41. Similarly, line 57 is connected to line 30 through one of solenoids A and B by switch 42.

In operation, momentarily contacting switch 34 energizes coil 38 thereby closing switches 56 and 58. Closure of switch 58 initiates the running of time delay means 39 and energizes solenoid A to cause rotation of valve 1 to the open position and cam 10 to close switch 35. After this operation chamber member 45 is held in the open position for a finite length of time until time delay means 39 runs out at which time switch 37 is opened, deenergizing coil 38 and opening switches 56 and 58. Switch 40 is closed by the running out of time delay means 39. Closure of switch 40 energizes coil 41 thereby switching 42 from solenoid A to solenoid B which causes rotation of chamber member 45 in the opposite direction for 90° until cam 10 breaks switch 35 by rotation into the position shown in FIGURE 4. This terminates the cycle and upon initiation of the subsequent cycle solenoid B will still be connected between lines 57 and 30 so that the first sub-increment of rotation in the subsequent cycle will be in the same direction as the last sub-increment of rotation in the prior cycle.

Figure 5:
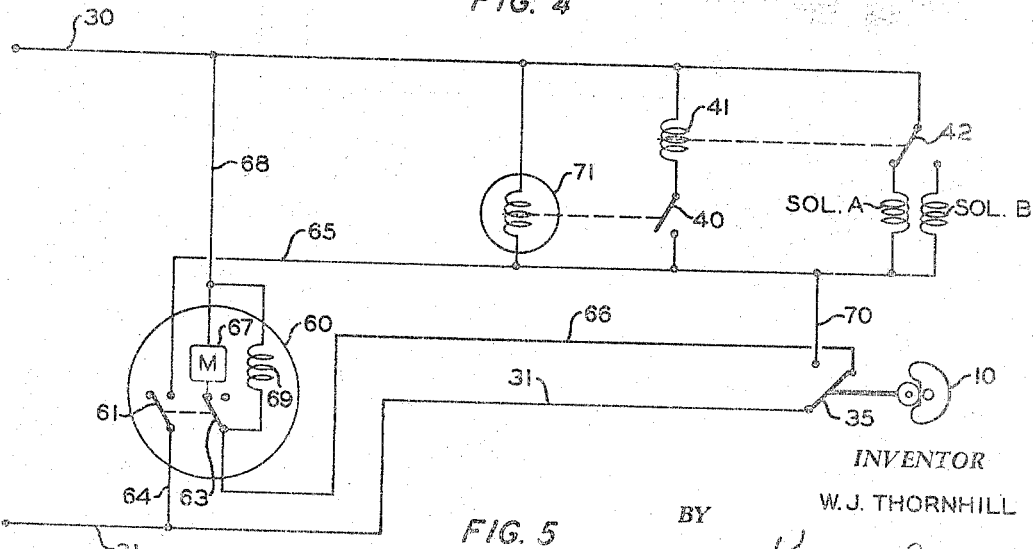

In FIGURE 5 line 30 is connected to line 31 through a conventional reset timer 60. Timer 60 has two switches 61 and 63 therein which move together from one position to the other of each switch. Line 64 connects line 31 through switch 61 to line 65. Line 66 connects line 31 through switch 35 and switch 63 to motor 67 and then through line 68 to line 30. Line 66 is also connected through coil 69 to line 30. In its second position, switch 35 connects line 30 through line 70 to line 65.

Line 65 is connected through time delay means 71 and through switch 40 and coil 41 to line 30. Similarly, solenoids A and B are connected between lines 65 and 30 by switch 42.

In operation, an electrical current passing into line 31 passes through switch 35 and line 66 into timer 60. In timer 60, the current passes through switch 63 to start operation of timer motor 67 and also energizes clutch coil 69. After a finite length of time which preferably can be varied manually, timer motor 67 runs out, opens switch 63 and closes switch 61, clutch coil 69 remaining energized notwithstanding the opening of switch 63.

Closure of switch 61 closes the circuit between lines 31 and 65 thereby starting time delay means 71 to run and energizing solenoid A. The energization of solenoid A operates upon valve 1 and cam 10 in the same manner as described above. Due to deenergization of solenoid A and rotation of chamber member 45 cam 10 is rotated 90° so that switch 35 is moved from line 66 to line 70. This movement of switch 35 deenergizes coil 69 and allows switches 61 and 63 to move back to the position shown in FIGURE 5 thereby resetting timer 60 for the next cycle. After time delay means 39 runs out, switch 40 is closed, coil 41 is energized and switch 42 is moved from solenoid A to solenoid B. As described above, this causes rotation of chamber member 45 in the reverse direction the extent of which rotation is limited by cam 10 which after approximately 90° of rotation breaks the circuit between lines 31 and 70 thus terminating the cycle. Upon termination of the cycle, time delay means 71 reopens switch 40 but solenoid B remains connected between lines 65 and 30 so that upon initiation of the subsequent cycle, chamber member 45 and cam 10 will continue rotation in the direction in which they were moving upon termination of the prior cycle.

The same or similar conventional time delay means can be employed for 71 as was employed for 39 in FIGURES 2 and 4. Reset timer 60 can be any conventional apparatus such as the Eagle Cycle-Flex reset timer type No. HP5 2 A6, preferably having variable timer settings in the range of 3 to 150 seconds.

The system of FIGURE 2 is ideally suited for being triggered (contacting of switch 34) by momentary electrical impulses such as that received from a computer but is not ideally adapted to operate on a continuous impulse because there is no provision for resetting switches in that system in preparation for a subsequent cycle unless the impulse is terminated for a finite length of time. It should be noted that if short electrical pulses are used to trigger the system, their frequency should not exceed that of the time delay and a necessary time for reverse travel of the valve and cam 10 to break switch 35. If the frequency is too high some pulses may not trigger a cycle. The system of FIGURE 4 has provision for operating upon a continuous impulse by the provision of electrically isolated switches 56 and 58. This system allows resetting of those switches which must be reset before a subsequent cycle can be initiated notwithstanding a long duration impulse causing long duration of contacting of switch 34. As long as switch 34 is contacted the system of FIGURE 4 will cause valve 1 to undergo repeated forward 90°—pause—reverse 90° cycles.

The use of timer 60 in FIGURE 5 improves in one aspect on the system of FIGURE 4 in that finite time delays can be inserted between repeated cycles notwithstanding the constant impulse to that system. Thus, where a constant impulse would cause the system of FIGURE 4 to run valve 1 through repeated cycles with no substantial time spacing therebetween, timer 69 of the system of FIGURE 5 allows the interposition of time delays of from 3 to 150 seconds between repeated cycles of valve 1 caused by a constant impulse to the system.

Reasonable variations and modifications are possible within the scope of this disclosure without departing from the spirit and scope thereof.

I claim:

1. Apparatus for effecting a rotation cycle of a rotatable member comprising forward a first sub-increment—pause—reverse a second sub-increment, each cycle being effected in an opposite initial rotation direction from the prior cycle, comprising a rotatable member, actuator means adapted to rotate said member a fixed increment in a first direction and then a substantially equal increment in an opposite direction, first power means operatively connected to said actuator means to cause said actuator means to rotate said member in a first direction through a first sub-increment of about one-half the magnitude of said fixed increment, time delay means operatively connected to said first power means and adapted to maintain said rotatable member for a finite period of time in the position reached by same at the termination of said first sub-increment of rotation, second power means operatively connected to both said time delay means and said actuator means, said second power means being adapted to rotate said rotatable member in a direction opposite to said first direction after said time delay means runs out through a second sub-increment substantially equal in magnitude to said first sub-increment.

2. The apparatus according to claim 1 wherein said first and second power means are further adapted to, after termination of the cycle of claim 1, rotate said rotatable member in said direction opposite to said first direction, through a third sub-increment equal in magnitude to said first sub-increment, are adapted to maintain said rotatable member in the position reached by same after termination of said third sub-increment of rotation, and then after said time delay again runs out, rotate said rotatable member in said first direction through a fourth sub-increment substantially equal in magnitude to said first sub-increment, each subsequent cycle beginning by either said first or second power means rotating said rotatable member in the same direction said member was moving when the prior cycle was terminated.

3. Apparatus for effecting a rotational cycle of a rotatable member which comprises a first forward sub-increment—pause—reverse second sub-increment, each cycle being effected in an opposite initial rotation direction, the improvement comprising a rotatable member, actuator means adapted to rotate said member a fixed increment in a first direction and then a substantially equal increment in the opposite direction, cam means carried by said actuator means and adapted to rotate in the same direction as said rotatable member, power means operatively connected to said actuator means comprising first means for causing said actuator means to rotate said member in said first direction through a first sub-increment, time delay means operatively connected to said first means and adapted to maintain said rotatable member for a finite period of time in the position reached by same after termination of said first sub-increment of rotation, second means operatively connected to both said time delay and said actuator means, said second means being adapted to rotate said rotatable member in a direction opposite to said first direction after said time delay means runs out through a second sub-increment substantially equal in magnitude to said first sub-increment, said first and second means being operatively connected to said cam means so that the length of said sub-increment is limited and the cycle terminated by movement of said cam means.

4. The apparatus according to claim 3 wherein said first and second means are further adapted to, after termination of the cycle of claim 3, rotate said rotatable member in said direction opposite to first direction through a third sub-increment substantially equal in magnitude to said first sub-increment, maintaining said rotatable member in the position reached by same after termination of said third sub-increment, and then after said time delay means again runs out, rotate said rotatable member in said first direction through a fourth sub-increment equal in magnitude to said first sub-increment, the length of said fourth sub-increment and termination of this second cycle being effected by rotation of said cam means, each subsequent cycle beginning by either said first or said second means rotating said rotatable member in the same direction said member was moving when the prior cycle was terminated.

5. Apparatus for effecting a rotation cycle of a rotatable feeding valve having opened and closed positions which cycle comprises a forward first sub-increment—pause—reverse second sub-increment, each cycle being effected in an opposite initial rotation direction from the prior cycle, comprising actuator means adapted to rotate said valve a fixed increment in a first direction and then a substantially equal increment in the opposite direction, means carried by said actuator means adapted to rotate with same and actuate a switch means during each sub-increment of rotation, first power means operatively connected to said actuator means and adapted to rotate said feeding valve in a first direction through a first sub-increment, the length of said first sub-increment being limited by said actuator reaching a first maximum rotational position, a second power means operatively connected to said actuator means and adapted to rotate said feeding valve in a second direction opposite to said first direction of said first power means, a time delay means operatively connected to said first and second power means, a first switch means adapted to be moved between said first and second power means thereby alternately energizing same, a second switch means operatively connected to said time delay means and said first and second power means and adapted to upon being closed energize said time delay means and whichever said first and second power means is contacted by said first switch means, a third switch means operatively connected to said means carried by said actuator, said third switch means being adapted to be closed by said means carried by said actuator means when said actuator means is in its maximum rotational position and open when said actuator means is in a position intermediate to said maximum rotational position, fourth switch means operatively connected to said time delay means and said first and second power means and adapted to be closed upon running out of said time delay means, means associated with said fourth switch means for switching said first switch means from one to the other of said power means when said fourth switch means is closed by said time delay means, said time delay means and said second switch means being of the type that automatically resets themselves upon opening of said third switch means.

6. The apparatus according to claim 5 wherein said means carried by said actuator means is a cam means, said actuator means is a spirally grooved shaft along which a piston is moved thereby rotating said shaft, and said first and second power means are solenoids, and said first switch means comprises a triggering means and a latching relay means associated so that momentary depression of said triggering means causes semipermanent depression of the relay switch of said latching relay.

7. Apparatus for effecting a rotation cycle of a rotatable feeding valve which cycle comprises a forward a first sub-increment—pause—reverse second sub-increment, each cycle being effected in an opposite initial rotation direction from the prior cycle, comprising actuator means adapted to rotate said feeding valve a fixed increment in a first direction and then a substantially equal increment in the opposite direction, means carried by said actuator means and adapted to rotate the same, first power means adapted to rotate said actuator means in a first direction through a sub-increment, second power means adapted to rotate said actuator means in a direction opposite to said first direction through said second sub-increment, a first switch means adapted to be moved between said first and second power means thereby alternately energizing same, a time delay means operatively connected to said first and second power means, a second switch means comprising a first triggering switch and first and second relay switches in a latching relay, said first and second relay switches being operatively isolated from one another, said triggering switch and first relay switch being operatively associated with one another and said second relay switch being operatively connected to said time delay means and said first and second power means, third switch means operatively associated with said means carried by said actuator means and adapted to be closed by said means when said actuator means is in a maximum rotational position and opened when said actuator is in an intermediate position, fourth switch means operatively connected to said time delay means and said first and second power means and adapted to be closed by said time delay means after running out of same, means associated with said fourth switch means adapted to be activated by closing of said fourth switch means and operatively connected to said first switch means so that upon energization and deenergization thereof said first switch means alternately moves between contacts with said first and second power means, said first relay switch being adapted to maintain a closed circuit after said triggering switch is reopened thereby maintaining the latching relay energized and said second relay closed, a fifth switch means operatively connected to said first relay switch and adapted to be opened when said time delay means runs out thereby deactivating said latching relay, said latching relay and time delay means being of the self-resetting type when deenergized.

8. The apparatus according to claim 7 wherein said means carried by said actuator means is a cam means and said first and second power means are solenoids.

9. Apparatus for effecting a rotational cycle of a rotatable feeding valve which cycle comprises a forward first sub-increment—pause—reverse second sub-increment, each cycle being effected in an opposite initial rotation direction than the prior cycle, comprising actuator means adapted to rotate said feeding valve a fixed sub-increment in a first direction and in a substantially equal increment in the opposite direction, means carried by said actuator means adapted to rotate with said actuator means, first power means operatively connected to said actuator and adapted to rotate same in a first direction through a first sub-increment, second power means operatively connected to said actuator means and adapted to rotate same in a direction reverse to said first direction through a second sub-increment, a time delay means operatively connected to said first and second power means, a first switch means adapted to alternately contact said first and second power means thereby alternately energizing same, a second switch means operatively connected to said means carried by said actuator means, a reset timer operatively connected to said time delay means and said first and second power means, said second switch being adapted to be in contact with said reset timer when said actuator is in a maximum rotational position and further adapted to be in contact with said first and second power means when said actuator means is in an intermediate position, third switch means operatively connected to said time delay means and first and second power means and adapted to be closed by running out of said time delay means, means associated with said third switch and adapted to be energized by closure of said switch and thereby move said first switch from one power means to the other power means, said reset timer being adapted after a finite time length to initiate running of said time delay means and actuate whichever power means is in contact with said first switch means, said reset timer and said time delay means being of the type that automatically reset when deenergized.

10. The apparatus according to claim 9 wherein said means carried by said actuator means is a cam means and said first and second power means are solenoids.

References Cited

UNITED STATES PATENTS

| | | | |
|---|---|---|---|
| 1,049,478 | 1/1913 | Hedgcock | 222—219 |
| 1,676,377 | 7/1928 | Bergmann | 222—1 |
| 1,811,957 | 6/1931 | Morton | 222—219 |
| 1,861,734 | 6/1932 | Bergmann | 222—219 X |
| 2,621,758 | 12/1952 | White | 222—219 X |
| 3,167,398 | 1/1965 | Whittington | 222—219 X |

SAMUEL F. COLEMAN, *Primary Examiner.*